Sept. 25, 1945.  C. P. CLAPP ET AL  2,385,333
FURNACE
Filed Feb. 2, 1942
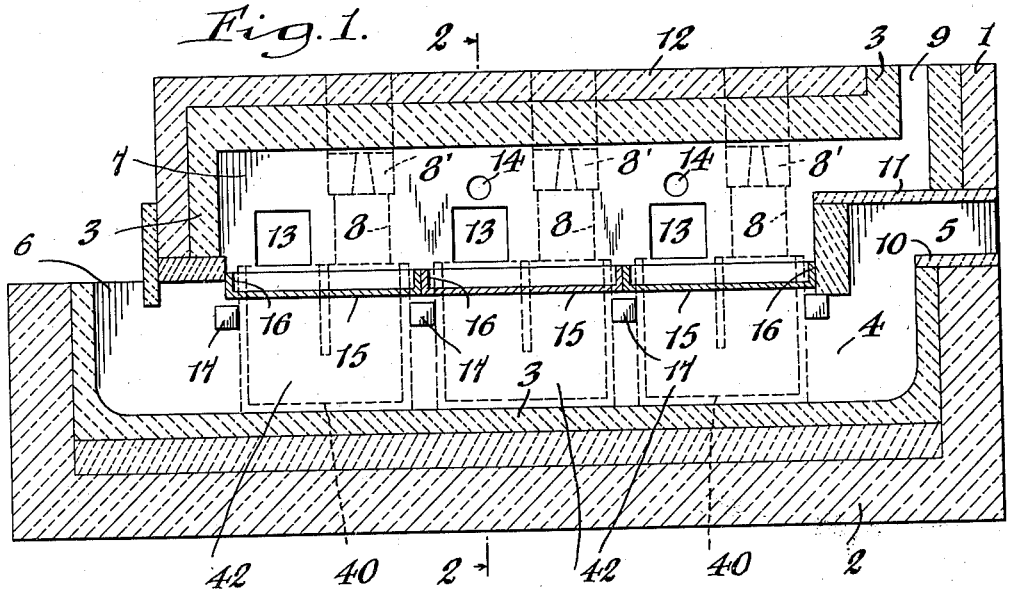
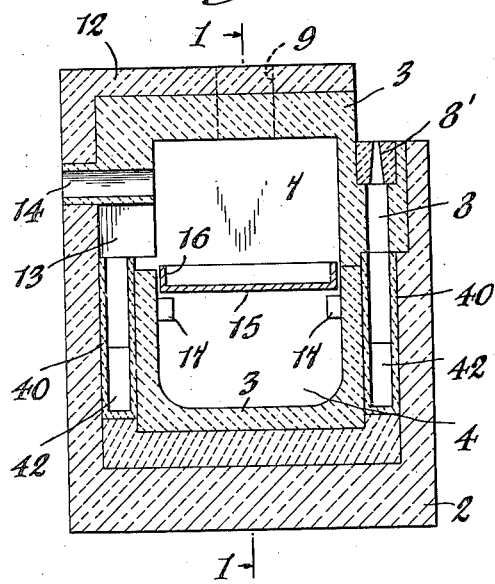 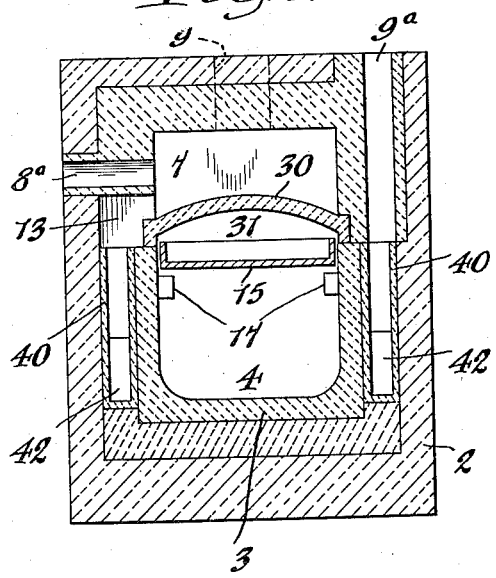
Inventors,
Channing P. Clapp
Boyd M. Johnson
by
Attorney Patented Sept. 25, 1945

2,385,333

UNITED STATES PATENT OFFICE 2,385,333

FURNACE

Channing P. Clapp, Fords, and Boyd M. Johnson, Metuchen, N. J., assignors to The Carborundum Company, Niagara Falls, N. Y., a corporation of Delaware Application February 2, 1942, Serial No. 429,219

11 Claims. (Cl. 266—33)

The invention of this application relates to improvements in the construction and operation of furnaces, particularly of furnaces used for the melting of metals and especially non-ferrous metals such as aluminum or other substances having a relatively low absorptivity of radiant heat.

The primary object of this invention is to provide a method whereby the effective rate of heat delivery in furnaces to substances of the class above referred to, may be increased. Other objects are to protect the surface of the molten mass in the furnace from contact with the atmosphere of the furnace and to produce a more uniform heating of the bath in the furnace.

The first of the above-mentioned objects can be accomplished by covering the surface of the molten material in the furnace with a cover of a material whose properties include high absorptivity for radiant heat, the lack of any appreciable tendency to react with the molten bath or heating gases, and high thermal conductivity.

In the drawing, Figure 1 is a longitudinal sectional view taken on line 1—1 of Figure 2, of a furnace embodying the improvements of the invention. Figure 2 is a sectional view taken on line 2—2 of Figure 1. Figure 3 is a sectional view similar to Figure 2 but showing a modified heating arrangement and a muffle arch.

The present invention as applied to a furnace will be more readily understood from the following description in which reference is made to the drawing. Shown in Figure 1 is a typical metal melting furnace 1 in which an insulating housing 2 lined with refractory material 3 forms a chamber 4 adapted to contain molten metal. Access to the chamber 4 is gained through refractory lined passage or charging space 5 into which metal may be charged in suitable form. A forehearth 6 is provided from which molten metal may be withdrawn.

A combustion chamber 7, also lined with refractory material and heated by burners 14, is provided over molten metal receiving chamber 4. Into chamber 7 through passages 8 additional products of combustion from suitable burners 8' or hot gases from other heating sources are directed and from this chamber all products of combustion pass out through one or more vents or flues 9, preferably located at the charging end of the furnace to provide for preheating of the cold incoming metal.

Metals generally and especially molten metals are outstanding examples of substances having low radiant heat absorptivity, the absorptivity of metals such as aluminum, copper, zinc and their alloys being .3 or lower as compared to the 1.0 of a theoretical black body. In a furnace of the type described, therefore, it is desirable to have in contact with the surface of the metal, a cover of a material such as hitherto discussed, which has a high absorptivity for radiant heat. This is provided in the illustrated furnace by tiles 15, provided with upstanding peripheral edges 16, adapted to float on the surface of the molten metal in chamber 4 and being so constructed as to fit together and against the walls of the furnace chamber 4 with only small clearances so as to prevent as far as possible, exposure of the metal to the furnace gas atmosphere. Refractory stops or rests 17 may be provided to prevent displacement of the tiles in the event the molten metal level falls unduly.

Tiles 15 are preferably made of bonded silicon carbide, though other materials such as graphite and in some cases solid metals of suitable melting point and having surfaces with a high absorptivity for radiant heat may also be used. The peripheral upstanding rims 16 on tiles 15 are not under all conditions necessary, since, where the specific gravity of the tiles is less than that of the molten metal they will float on the surface of the metal without being rimmed. It will be realized that the tiles 15 must have a comparatively high heat-conductivity and must, in operation, have good contact with the molten metal over a large area in order to operate efficiently.

In some cases thin granular layers or dispersed granules of materials having a high absorptivity for radiant heat may be used instead of the solid tile. Among the granular materials which may be useful for this purpose are silicon carbide, graphite, fused alumina, chromite ore and ilmenite. All of these substances have an absorptivity of radiant heat approaching that of a black body, that is of about .9. Where a blanket or layer of granular material is used on the surface of the material or in other operations where it is desired to avoid all contact of oxygen or flue gases with the surface of the metal being melted, it may be necessary to provide a neutral or reducing atmosphere above the granular layer or tile covering the surface of the metal. In such cases a muffle may be provided as shown in Fig. 3 where an arch 30 of suitable refractory material rests on the refractory side walls of the furnace. In the operation of this construction the arch 30 is heated by the products of combustion in combustion chamber 7, tile 15 is heated by radiation from arch 30 and in turn conducts heat to the metal bath. A controlled atmosphere may be maintained in chamber 31 between muffle arch 30 and tile 15 by any suitable means (not shown).

As shown in the drawing advantage is taken of the high heat-conductivity of bonded silicon carbide refractories to further increase the rate of heating in the furnace by providing in the refractory lining walls of heating chamber 4, hollow tiles 40 of bonded silicon carbide so constructed that U shaped passages 42 are formed therein, which passages connect at one end through ports 13 with combustion chamber 7. In Figures 1 and 2 the products of combustion from burners 8' pass down through passages 8, the U-shaped passages 42 in tiles 40 and out through ports 13 into combustion chamber 7. From chamber 7 products of combustion escape through flue or flues 9.

In Figure 3 a somewhat different arrangement is shown, the combustion gases being introduced into the combustion chamber 7 through passages or burners 8a and passing from chamber 7 via ports 13 through U-shaped passages 42 in tiles 40 to the atmosphere through flues 9a. It is desirable, in the construction shown in Figure 3, to also include one or more flues 9 at the end of combustion chamber 7 through which, if desired, some or all of the gases may be discharged without passing below the level of the metal bath. The provision of flue or flues 9 for auxiliary or alternative use is important since in the event of stoppage or blocking of the U-shaped passages 42 the exhaust of combustion gases from chamber 7 would not be interrupted.

As shown in the drawing, tiles 40 are so constructed that the openings of passages 42 are above the surface of the metal bath, thus preventing the loss of metal which would result if the openings were below the surface of the bath and one or more of the tiles should crack. Thus, even if all of tile 40 should crack on their sides in contact with the bath or become otherwise stopped up, the furnace still could be operated in an emergency, though of course at a reduced efficiency and rate of output.

It will be understood that the heat-absorptive covering may be used for increasing heating efficiency without the use of hollow tile 40, or vice versa. However, the use of the tiles 40 is desirable not only from the standpoint of the increased heating surface for the metal thus provided, but also because they allow the appplication of heat near the bottom of the bath, thereby promoting circulation of the molten metal and consequently more uniform heating and more rapid heat transfer. When heat is applied only to the top of the bath there is a tendency for the metal near the top to remain considerably hotter than the lower part of the bath because of the lower density of the hotter metal. Consequently, with top heating alone the only means of bringing the lower portions of the bath up to the desired temperature is by conduction through the molten metal itself. While in some cases this is satisfactory, with metals having relatively low heat conductivity such as molten aluminum a great improvement in the rate of heating is obtained by the use of submerged heating units such as tiles 40.

During the operation of the furnace shown in Figures 1 and 2 metal pigs are fed into the furnace through charging space 5 and may be pre- heated while lying on the floor 10 thereof by radiation from the refractory wall 11 of flue 9. After preheating, the metal pigs are dropped into the bath of molten metal contained in chamber 4 where they, too, become molten. Molten metal as desired for casting or other purposes may be dipped or otherwise removed from forehearth 6.

The molten metal in chamber 4 is heated by conduction from refractory tiles 15 in contact with the metal, and from the walls of hollow tiles 40. Both tiles 15 and 40 are heated directly by combustion gases from burners 8' and/or 14 and in addition tiles 15 are heated by radiation from the refractory lining 3 of combustion chamber 7 since lining 3 is well insulated by insulation 12 and will therefore be at a somewhat higher temperature than tiles 15 which are in contact with the metal and thus lose heat by conduction.

The operation of the modified furnace shown in Figure 3 is essentially the same as above described but here the tiles 15 are heated by radiation from muffle arch 30 which in turn is heated by the combustion gases in chamber 7.

While the invention of this application has been particularly described in connection with one type of furnace it will be understood that the principles of the invention can be applied to furnaces of other types and the advantages thereof may be obtained with many variations in construction which will be suggested by the foregoing description.

Having thus described our invention we do not wish to be limited by the details in the description but only by the scope of the following claims.

We claim:

1. A metal-melting furnace comprising: a housing; a combustion chamber in said housing; at least one inlet and at least one outlet for said combustion chamber; a heating chamber in said housing; an inlet and an outlet for said heating chamber; a heat-conductive refractory wall separating said heating chamber and said combustion chamber; said refractory wall comprising tile of a material having a high coefficient of absorptivity for radiant heat and being adapted to float on molten metal contained in said heating chamber.

2. A metal-melting furnace as set forth in claim 1 in which a muffle arch supported by the side walls of said heating chamber is interposed between said combustion chamber and said heat-conductive refractory wall.

3. A metal-melting furnace comprising: a housing; a combustion chamber in the upper portion of said housing; a plurality of inlets and at least one outlet for said combustion chamber; a heating chamber in said housing; an inlet and an outlet for said heating chamber; a wall of heat-conductive refractory material separating said heating chamber and said combustion chamber; said wall comprising tiles formed of a material having a high coefficient of absorptivity for radiant heat and being adapted to float upon molten metal contained in said heating chamber.

4. A metal-melting furnace comprising: a housing; a combustion chamber in said housing; inlets and at least one outlet for said combustion chamber; a heating chamber in said housing; an inlet and an outlet for said heating chamber; said heating chamber and combustion chamber being separated by a heat-conductive refractory wall, said refractory wall comprising tile formed of bonded silicon carbide and being adapted to float on molten metal contained in said heating chamber.

5. A metal-melting furnace comprising: a housing; a combustion chamber in said housing; at least one inlet and at least one outlet for said combustion chamber; a heating chamber in said housing; an inlet and an outlet for said heating chamber; heat-conductive refractory hollow tiles forming at least a portion of the wall of said heating chamber, said hollow tiles having U-shaped passages therein adapted to conduct heating gases whereby heat is transferred to said heating chamber.

6. A metal-melting furnace comprising: a housing; a combustion chamber in said housing; a plurality of inlets and at least one outlet for said combustion chamber; a heating chamber in said housing; an inlet and an outlet for said heating chamber; heat-conductive refractory hollow tiles forming at least a portion of the wall of said heating chamber, said hollow tiles having U-shaped passages therein adapted to conduct heating gases whereby heat is transferred to said heating chamber, and the ends of said U-shaped passages being so located as to be above the level of a bath of molten metal contained in said heating chamber.

7. A metal-melting furnace as set forth in claim 6 in which a muffle arch supported by the side walls of said heating chamber is interposed between said combustion chamber and said heating chamber.

8. A metal-melting furnace comprising: a housing; a combustion chamber in said housing; inlets and outlets for said combustion chamber; a heating chamber in said housing; an inlet and an outlet for said heating chamber; heat-conductive refractory hollow tiles forming at least a portion of the wall of said heating chamber; said hollow tiles having U-shaped passages therein; a heat-conductive refractory wall separating said heating chamber and said combustion chamber; said refractory wall comprising tile of a material having a high coefficient of absorptivity for radiant heat and being adapted to float on molten metal contained in said heating chamber; said U-shaped passages communicating at one end with said combustion chamber and at the other end with the exterior of said housing; whereby molten metal in said heating chamber will be heated by conduction from said tiles.

9. A metal-melting furnace comprising: a housing; a combustion chamber in said housing; inlets and at least one outlet for said combustion chamber; a heating chamber in said housing; an inlet and an outlet for said heating chamber; a heat-conductive refractory wall separating said heating chamber and said combustion chamber; said refractory wall comprising tile of a material having a high coefficient of absorptivity for radiant heat and being adapted to float on molten metal contained in said heating chamber; heat-conductive refractory hollow tiles forming at least a portion of the wall of said heating chamber and containing U-shaped passages therein; said passages communicating at one end with said combustion chamber and at the other end with a source of heating gases; whereby molten metal in said heating chamber will be heated by conduction from said tiles.

10. A metal-melting furnace as set forth in claim 9 in which a muffle arch supported by the side walls of the heating chamber is interposed between said combustion chamber and said heat-conductive refractory wall.

11. A metal-melting furnace comprising: a housing; a combustion chamber in said housing; inlets and at least one outlet for said combustion chamber; a heating chamber in said housing; an inlet and an outlet for said heating chamber; a heat-conductive refractory wall separating said heating chamber and said combustion chamber; said refractory wall comprising tile of a material having a high coefficient of absorptivity for radiant heat and being adapted to float on molten metal contained in said heating chamber; heat-conductive refractory hollow tiles forming at least a portion of the wall of said heating chamber and containing U-shaped passages therein; said passages communicating at one end with said combustion chamber and at the other end with a source of heating gases; the ends of said U-shaped passages being located above the level of the molten metal bath contained in said heating chamber.

CHANNING P. CLAPP.
BOYD M. JOHNSON.